(12) United States Patent
Ciocca

(10) Patent No.: US 6,347,564 B1
(45) Date of Patent: *Feb. 19, 2002

(54) FASTENER-DRIVING HAND TOOL HAVING AN ANGULARLY DISPLACEABLE BIT RETAINER

(76) Inventor: Quintino Matthew Ciocca, 620 Saxonburg Blvd., Pittsburgh, PA (US) 15238

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,799

(22) Filed: Sep. 28, 1998

(51) Int. Cl.$^7$ .............................................. B25B 23/16
(52) U.S. Cl. ..................................... 81/177.8; 81/177.7
(58) Field of Search ............................. 81/177.6, 177.7, 81/177.75, 177.85, 177.8, 177.9; 403/114, 116

(56) References Cited

U.S. PATENT DOCUMENTS

| 2,182,673 | A | | 12/1939 | Magnano | |
|---|---|---|---|---|---|
| 2,773,529 | A | | 12/1956 | Valenti | |
| 4,271,731 | A | | 6/1981 | Suligoy et al. | |
| 4,711,145 | A | | 12/1987 | Inoue | |
| 4,807,499 | A | * | 2/1989 | Martinez | 81/177.75 |
| 5,042,332 | A | | 8/1991 | Nickipuck | |
| 5,142,953 | A | * | 9/1992 | Lin | 81/63 |
| 5,329,834 | A | * | 7/1994 | Wong | 81/58.3 |
| 5,515,754 | A | * | 5/1996 | Elkins | 81/177.9 |
| 5,577,426 | A | | 11/1996 | Eggert et al. | |
| 6,092,441 | A | * | 7/2000 | Jarvis | 81/177.2 |

* cited by examiner

Primary Examiner—Timothy V. Eley
Assistant Examiner—Dung Van Nguyen
(74) Attorney, Agent, or Firm—George C. Atwell

(57) ABSTRACT

A tool for manually driving fasteners having a handle, a shank, and a working tip or bit retainer includes a ball joint for allowing angular displacement of the bit retainer relative to the tool's longitudinal axis so that the tool can be directed into difficult-to-reach areas. The tool further includes a rotatable sleeve threadably mounted on the distal end of the shank, a ball joint disposed at the distal end of the shank, and the tool bit retainer secured to the ball joint by a retaining pin and capable of holding one of a variety of bits. Rotation of the sleeve on the shank binds the bit retainer in axial alignment with the shank, and counter-rotation of the sleeve releases the bit retainer for angular displacement or repositioning with respect to the tool's longitudinal axis.

5 Claims, 2 Drawing Sheets

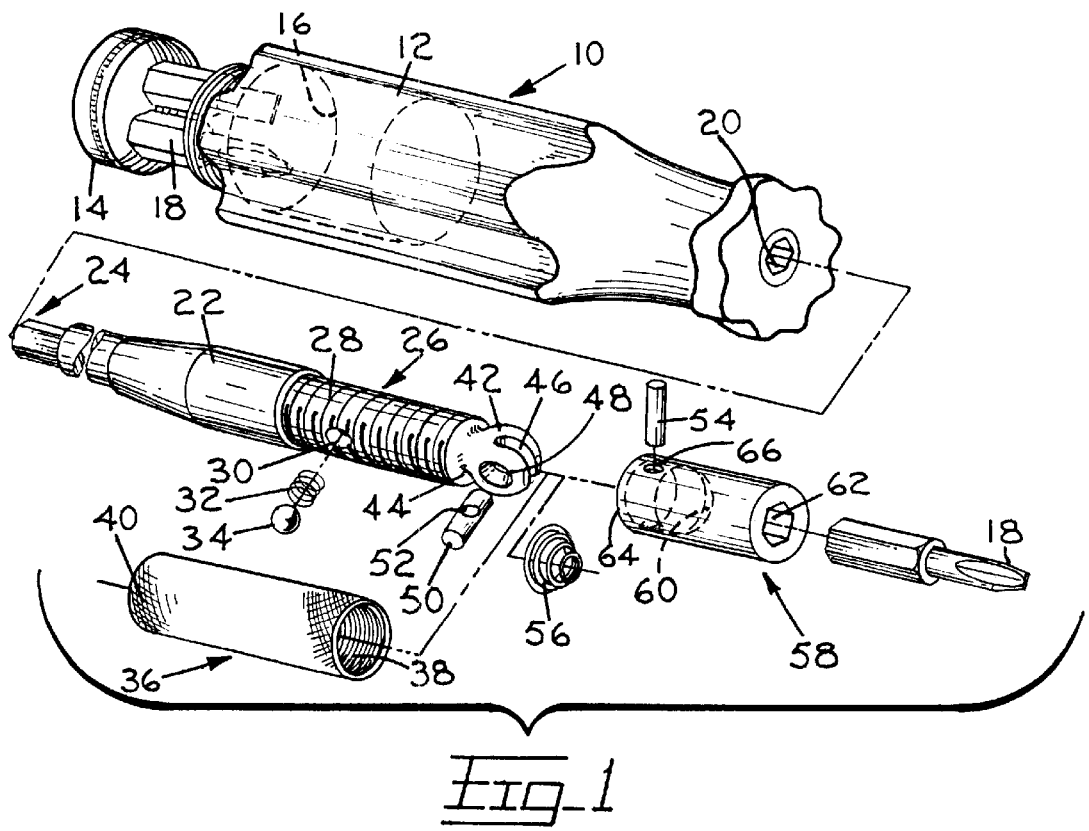
Fig_1
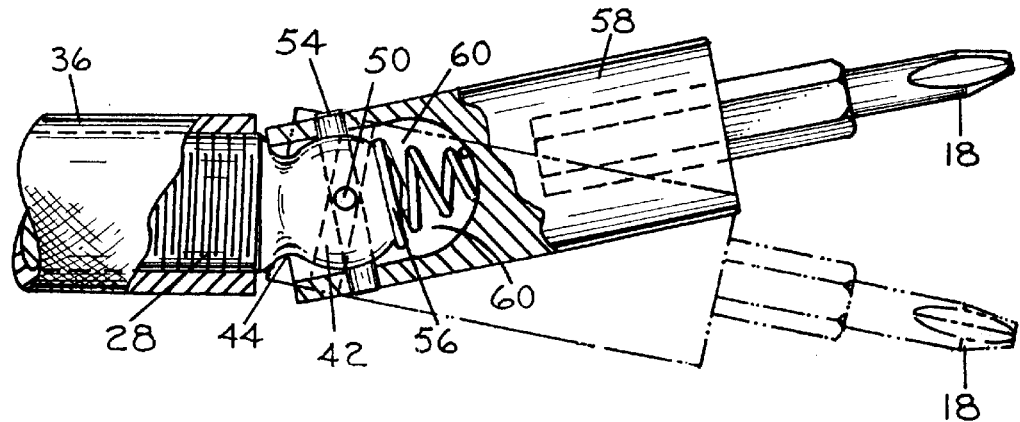
Fig_3
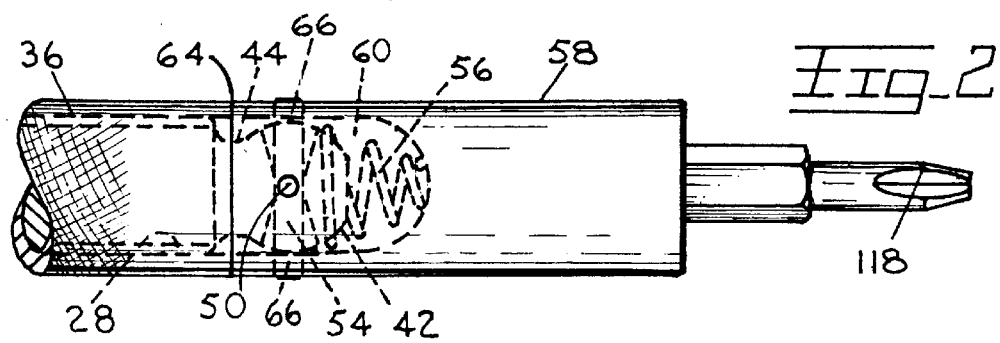
Fig_2

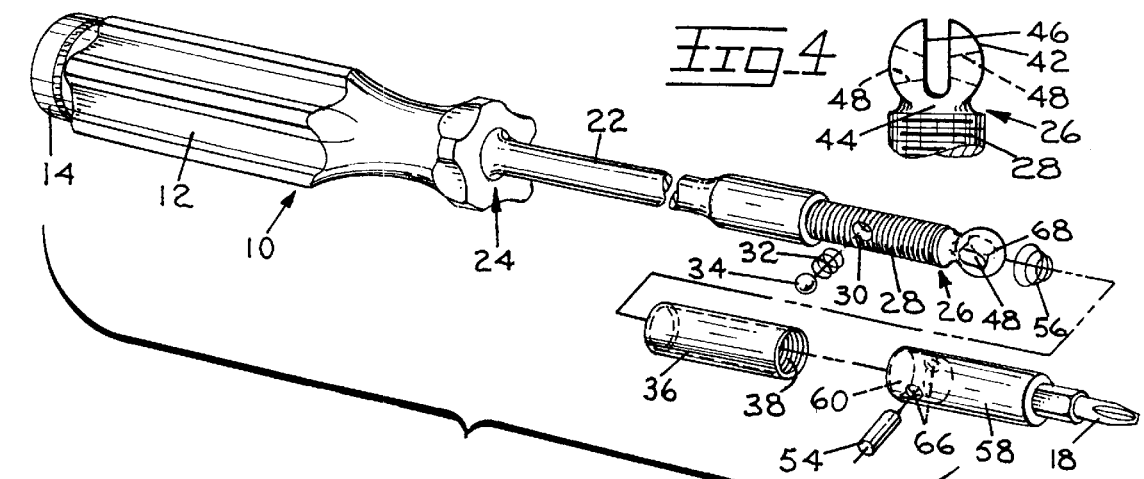
Fig. 4
Fig. 5
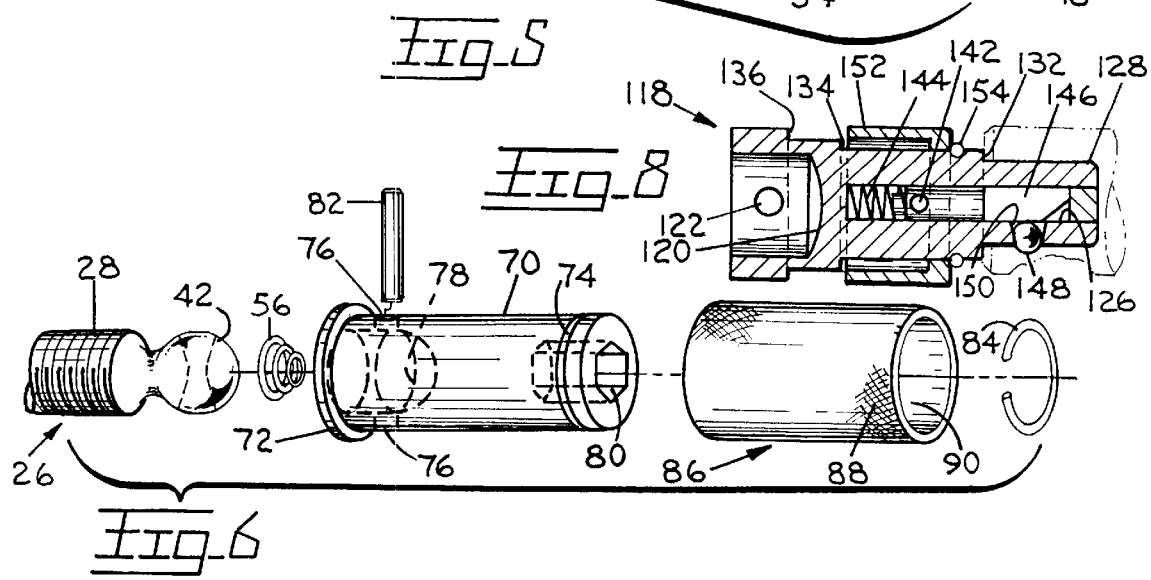
Fig. 8
Fig. 6
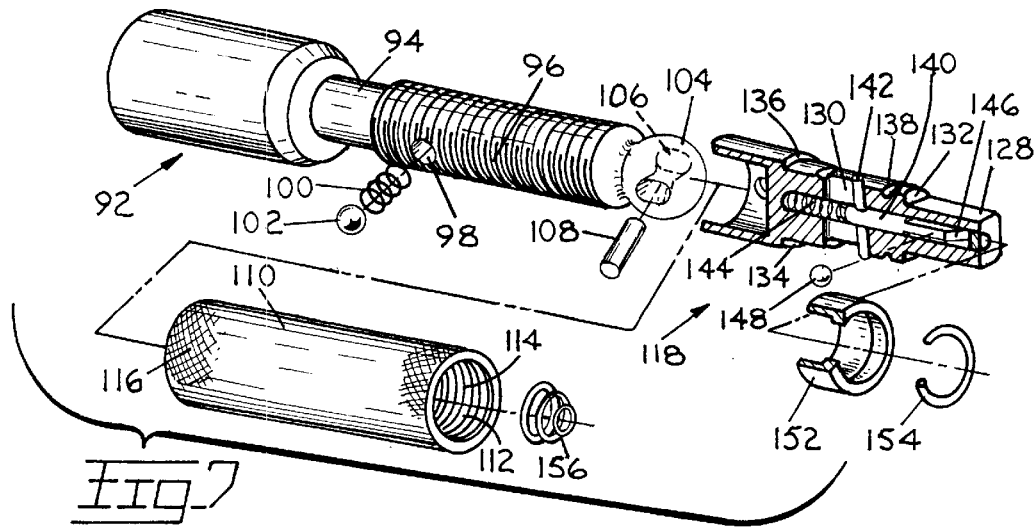
Fig. 7

0
FASTENER-DRIVING HAND TOOL HAVING AN ANGULARLY DISPLACEABLE BIT RETAINER

FIELD OF THE INVENTION

The present invention relates generally to hand tools, and, more particularly, pertains to a hand tool for manually driving fasteners and having a swivelable and rotatable bit retainer.

The typical screwdriver-type hand tool includes a handle, a shank extending from the handle in axial alignment therewith, and a distal working end. The distal working end can be integral with the shank and formed into a slotted head or a Phillips head, the two most common types of working ends, or the working end can be formed into an integral socket head, and such a fastener-driving tool is commonly referred to as a nutdriver. The working end of a fastener-driving tool can be formed into an integral socket retainer for use with a variety of interchangeable bits.

In many endeavors, such as home remodeling and repair and automotive maintenance, the location of fasteners prevents the user from directly aligning the working end of the tool with the fastener. This impedes the ability of the user to apply a maximum torque to the fastener.

In order to overcome this problem, hand tools have been designed that have working ends displaceable or pivotable away from the longitudinal axis of the shank of the tool.

DESCRIPTION OF PRIOR ART

U.S. Pat. No. 2,182,673 (Magnano) discloses a chuck pivotably attached to spaced-apart ears which project from a screwdriver handle. The chuck pivots between the standard straight position and a right-angled position.

U.S. Pat. No. 2,773,529 (Valenti) discloses a screwdriver having a pivotable tool bit part which allows it to be pivoted to a right angle to the screwdriver shank by the rotation of a clamp member which manually holds the tool bit part in alignment with the shank.

U.S. Pat. No. 4,271,731 (Suligoy et al.) discloses a screwdriver having a pivotable tip or working end and a shank having an inner bore within which a shaft is slidingly positioned for reciprocal movement. Attached to the outer end of the shaft is a pivot member which holds the tip. Sliding the shaft toward the handle maintains the tip in rigid alignment with the shank, and sliding the shaft away from the handle permits the pivot member to pivot at a right angle to the shank axis.

U.S. Pat. Nos. 4,711,145 (Inoue); 5,042,332 (Nickipuck); and 5,577,426 (Eggert et al.) each teach fastener-driver constructions having an angularly-displaceable component.

Despite the ingenuity of the above-described tools, there remains a need for a tool having a tip or working end that can be manually rotated throughout 360° relative to the shank axis, pivoted or swiveled on an axis transverse to the shank axis, and hold its angular displacement during tool use, and yet be quickly and easily returned to its rigid axial alignment.

SUMMARY OF THE INVENTION

The present invention comprehends a hand tool for fastener driving and, more particularly, comprehends a ball joint incorporated into the distal end of the shank of a fastener driving hand tool for allowing angular displacement of the bit end or working tip relative to the longitudinal axis of the shank in order to access and manipulate fasteners in otherwise inaccessible locations.

The present invention is a hand tool having a swiveling and rotatable bit retainer or working tip and includes a handle and a projecting shank having a partially threaded distal end which terminates at a ball joint. A cylindrical sleeve having interior threads is disposed on the threaded distal portion of the shank and the sleeve is rotatable for linear reciprocable movement on the shank. The ball joint includes a slot or aperture extending transversely through the ball joint and into which a retaining pin is inserted. Mounted on the slotted ball joint is a tool bit retainer for receiving and holding various types of screwdriver bits or tips. In addition, mounted on the ball joint and projecting into a cavity of the tool bit retaining member is a compression spring that assists in maintaining the angular disposition of the screwdriver bit and the tool bit retainer.

A retaining pin is used to attach the tool bit retainer to the ball joint for allowing angular displacement of the retainer. In order to maintain the rigid, axial alignment of the retainer and the screwdriver bit with the shank and handle, the cylindrical sleeve is rotated on the shank so that it firmly contacts the base of the retainer, and this locks the retainer in alignment with the shank and prevents the tool bit retaining member from angular movement on the ball joint. Angular displacement of the retainer results when the cylindrical sleeve is counter-rotated on the handle, and this rotation releases the retainer for angular displacement with respect to the longitudinal axis of the shank.

An alternative embodiment of the invention includes an improved socket extension for quickly and efficiently locking and releasing a socket thereto. The improved socket extension includes an elongated socket extension member which terminates at a distal end formed into a socket extension head. A T-shaped recess extends within the socket member to the socket extension head, and disposed therein for reciprocable and slidable movement is a T-shaped locking and releasing member. The tip portion of the T-shaped member that travels within the socket member is sloped to allow a locking ball to ride thereupon. The socket extension head has a single aperture located on one of its flat faces and through which the locking ball partially projects for locking a socket to the socket extension head. The T-shaped member is spring-loaded so that moving the T-shaped member toward the handle causes the locking ball to travel slightly inward away from the aperture for releasing the socket from the socket extension head while forward movement of the T-shaped member forces the locking ball outward for partially projecting through the aperture so that the socket can be locked to the socket extension head. The ball joint of this embodiment pivotably attaches the elongated socket extension member to the shank of the hand tool.

It is an objective of the present invention to provide a hand tool for driving fasteners having a rotatable or swivelable working tip for reaching areas inaccessible to a hand tool having a rigid working tip.

It is another objective of the present invention to provide a hand tool having a working tip or bit retainer that maintains its angular disposition throughout its period of use in driving a fastener, and can also be quickly selectively locked into axial alignment with the tool's shank.

Yet another objective of the present invention is to provide an improved socket extension for a fastener-driving hand tool which quickly and efficiently locks and releases sockets to a universal socket head and is capable of pivotable movement about a point on the tool's longitudinal axis.

These objectives, together with other objects and advantages which will become subsequently apparent, reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

FIG. 1 is an exploded assembly view of a hand tool in accordance with a presently preferred embodiment of the invention;

FIG. 2 is a fragmentary side elevational view of the invention first shown in FIG. 1 illustrating the hand tool in its rigid, axial disposition;

FIG. 3 is a fragmentary side elevational view of the tool first shown in FIG. 1 illustrating the range of angular displacement of a bit retainer with respect to the tool's axis;

FIG. 4 is a fragmentary elevational view of the tool first shown in FIG. 1 and showing an enlarged view of a ball joint of the tool shown in FIG. 3;

FIG. 5 is an exploded assembly view of the tool first shown in FIG. 1 illustrating a slightly modified ball joint which uses only one retaining pin;

FIG. 6 is a perspective view of certain components of the tool first shown in FIG. 1 and illustrating a modified bit retainer;

FIG. 7 is an exploded assembly view of an alternate embodiment of a ball joint for a socket extension capable of angular displacement; and FIG. 8 is an elevational view in vertical section of the socket extension first shown in FIG. 7.

DETAILED DESCRIPTION OF THE PREFERRED EMBODIMENT

Illustrated in FIGS. 1–8 are several embodiments of various types of hand tools in accordance with the present invention including a ball joint assembly for allowing the tip, bit retainer, or socket extension of the respective type of hand tool to swivel, pivot or rotate so that angular displacement relative to the longitudinal axis of the hand tool can occur. The hand tool can thus be effectively used to drive fasteners that are located in difficult-to-reach areas, or areas that are inaccessible to a hand tool having a rigid shank and working end.

As shown in FIGS. 1–5, which illustrate the first preferred embodiment, one type of hand tool adapted for angular displacement is a hand tool 10 of the screwdriver type. This hand tool 10 provides both straight drive and offset angle drive capabilities for the user, and may be referred to as a swivel shaft screwdriver. This hand tool 10 includes a handle 12 having a removable cap or lid 14 which covers an integrally-formed bit receptacle or hollow 16 formed within the handle 12, and which serves as the storage receptacle for a plurality of tool bits 18, such as the common slotted head, Phillips head, torque, and hex bits. The handle 12 also includes an insertion hole 20 opposite the bit receptacle 16, and this insertion hole 20 (which is a blind hole) is for receiving an elongated, rigid shank 22. As shown in FIG. 1, the attachment end or the rear attachment portion 24 of the shank 22 is removably insertable into the hole 20. While the hand tool 10 of FIG. 1 shows the handle 12 and shank as separate structural elements, it is also quite common for the handle and shank to be an integral one-piece unit whereby the shank is permanently secured to the handle. In addition, whether the shank 22 is integrally attached to the handle 12 or removably attachable thereto, both types of shanks can be used with a variety of handles, such as standard plastic handles, ergonomic cushion handles, ratcheting handles, etc.

As shown in FIGS. 1–3 and FIG. 5, opposite the rear attachment or insertion end or portion 24 of the shank 22 is a distal portion or end 26. It should be noted that the shank 22, whether integrally attached to the handle 12 or insertably removable from the handle 12, is disposed in axial alignment therewith so that the shank 22 is concentric with the handle 12 and the shank 22 does not pivot, swivel or rotate relative to any defined axis. Located at the distal portion 26 of the shank 22 are a series of threads 28, but the threads 28 do not comprise a major portion of the surface of the shank 22. A blind hole 30 is formed into the side of the shank 22 at the threaded portion 28, and the blind hole 30 is sized to receive a small compression spring 32 which is fully seated within the blind hole 30. Also partially received within the blind hole 30 is a small metal resistance ball 34 which is biased toward the surface of the threads 28 by the spring 32.

As shown in FIGS. 1–4, received onto the threaded portion 28 of the shank 22 is a working end locking and releasing means for selectively locking the working end of the hand tool 10 so that the working end is in fixed axial alignment with the shank 22 and handle 12, and also for releasing the working end so that the working end is able to pivot, swivel or rotate for angular displacement on, about or relative to the longitudinal axis of the shank 22 and handle 12. The working end locking and releasing means is selectively manually rotatable upon the threads 28 of the shank 22, and the locking and releasing means further includes a selectively rotatable, cylindrical locking and releasing sleeve 36. The sleeve 36 is cylindrical or tubular-shaped and includes an interior longitudinal bore circumjacent to which are interior threads 38. The interior threads 38 of the sleeve 36 are engaged to or mate with the threads 28 of the distal portion 26 of the shank 22. The sleeve 36 also includes a knurled exterior surface 40 which facilitates a firm and secure grip for the user.

Illustrated in FIGS. 1–5 is a means to allow the working end to pivot, swivel or rotate on, about or relative and with respect to the longitudinal axis of the tool 10 so that a selected angular displacement is obtained. In the embodiment of the invention shown in FIGS. 1–5, the working end angular displacement means is integrally attached to the distal end 26 of the shank 22 and is located adjacent the threads 28 of the shank 22. The angular displacement means includes a ball joint 42 which is essentially a rounded structure integrally formed from the distal portion 26 of the shank 22 by a neck portion 44. The ball joint 42 could be manufactured as a separate structural element insofar as a threaded stud could project from the ball joint 42 and the distal portion 26 of the shank 22 could include an interior threaded bore longitudinal to the shank axis so that the projecting stud could be screwed into the distal shank portion 26. Whether as a separate structural element or integrally formed thereto, the ball joint 42 is positioned in rigid axial alignment with the handle 12 and shank 22 of the tool 10.

The ball joint 42 includes structural elements that allow the working end to be freely rotated in a circular motion around the handle 12 and shank 22 axis throughout the full 360° range of motion when the locking and releasing sleeve is rotated to the release position so that a maximum angular displacement of the working end can occur. In addition, the ball joint 42 allows the working end to swing or swivel on a transverse axis extending through the ball joint 42 perpendicular to the longitudinal axis. The angular range of swinging or swiveling motion of the working end is at least 60° relative to the longitudinal axis of the shank 22. The ball joint 42 includes a pin receiving slot 46 that divides the ball joint 42 into two equal mouth portions as viewed in FIG. 4. In addition to the pin receiving slot 46, the ball joint 42 also includes an hourglass-shaped slot or aperture 48 which is disposed perpendicular and transverse to the pin receiving slot 46. The aperture 48 extends through one mouth portion into and through the opposite mouth portion and registers with the pin receiving slot 46 at both opposed inwardly-tapering portions of each half of the aperture 48.

In order to attach the elements which comprise the working end of the hand tool 10 to the ball joint 42, at least one pin is required. The hand tool 10 shown in FIGS. 1–3 uses two pins while the hand tools shown in FIGS. 5 and 6 requires one pin. More specifically, the embodiment of the hand tool shown in FIGS. 1–4 uses two pins: a first retaining pin 50 which is inserted through the aperture 48 and which includes a centrally-located bore 52 extending completely therethrough and transverse to the longitudinal axis of the first retaining pin 50; and a second retaining pin 54 received in the pin receiving slot 46 and passing through the centrally-located bore 52 of the first retaining pin 50 thereby locking both pins 50 and 54 to the ball joint 42. Seated on what may be referred to as the head of the ball joint 42 is a tapered, conical compression spring 56 which slides on the head of the ball joint 42 concomitant with the swiveling or rotational movement of the working end of the tool 10. As will be more fully described hereinafter, the disposition of the spring 56 provides a resistive force to maintain the particular angular displacement of the working end after the working end has been swiveled or rotated on the ball joint 42 by the user.

As shown in FIGS. 1–3, the working end includes a cylindrical tool bit retainer 58 mounted to the ball joint 42 for pivotable, rotational or swiveling movement thereon. The retainer 58 includes a ball joint receiving cavity 60 which is somewhat dome-shaped and an opposite tool bit socket 62 which is of standard hexagonal shape for receiving and holding therein one of a wide variety of aforedescribed bits. The retainer 58 also includes an annular lower rim 64 which is disposed in selective abutting engagement to the sleeve 36. The retainer 58 also includes a pair of small circular bores 66 which extend through opposite sidewalls of the retainer 58 so that the bores 66 register with the cavity 60. In order to mount the retainer 58 to the ball joint 42, one method of assembly first requires insertion of the first pin 50 through the aperture 48. The conical resistance spring 56 is then placed on the head of the ball joint 42 and then the retainer 58 is placed on the ball joint 42 so that the spring 56 is fully encompassed within the cavity 60 and seated on the head of the ball joint 42. The cavity 60 is sized so as to completely receive and encompass therein the ball joint 42 and the spring 56 as shown in FIGS. 2 and 3. The second pin 54 is then inserted through one bore 66 in the sidewall of the retainer 58 and is carefully directed through the pin receiving slot 46 and through the centrally-located bore 52 of the first pin 50 whereupon the second pin 54 registers with and is inserted into the opposite bore 66 so that both ends of the second pin 54 are flush with the sidewall of the retainer 58. The centrally-located bore 52 of the first pin 50 and the circular bores 66 of the retainer 58 are preferrably snug fits so that the second pin 54 will firmly anchor and secure the retainer 58 to the ball joint 42 while allowing pivotable, swiveling or rotational movement of the working end which comprises the retainer 58 and one of the selected tool bits 18. The use of two retaining pins 50 and 54 permits a greater angular displacement of the working end of the hand tool 10 as opposed to using only one retaining pin.

FIGS. 2 and 3 illustrate the manner in which the working end of the tool 10 is locked to maintain the working end in axial alignment with the shank 22 and handle 12 or released to allow angular displacement of the working end relative to the longitudinal axis of the shank 22 and handle 12 by pivotable, swiveling or rotational movement. FIG. 2 illustrates the working end of the hand tool 10 disposed in rigid axial alignment with the shank 22 and handle 12. In order to maintain the working end in rigid alignment, the locking and releasing sleeve 36 must be rotated upon the threaded distal portion 26 of the shank 22 so that the sleeve 36 moves away from the handle 12 and toward the ball joint 42 whereupon the sleeve 36 when fully rotated abuts the lower annular rim 64 of the retainer 58. FIG. 2 illustrates the disposition of the sleeve 36 for locking the working end in rigid axial alignment with the shank 22 and handle 12 and shows the sleeve 36 disposed contiguous to the rim 64. When the working end is locked in alignment with the shank 22 and handle 12, the position of the resistance spring 56 contained within the cavity 60 of the retainer 58 is concentric to the retainer 58, the sleeve 36, the shank 22, and the handle 12.

As shown in FIG. 3, in order to unlock the retainer 58 and release it for full pivotable, swiveling or rotational movement on the ball joint 42, the user simply rotates the sleeve 36 on the threads 28 of the shank 22 so that the sleeve 36 moves away from the retainer 58 and toward the handle 12 of the tool 10. As shown in FIG. 3, full rotation of the sleeve 36 toward the handle 12 causes the sleeve 36 to physically disengage from its annular abutment to the lower rim 64 of the retainer 58. Completely backing the sleeve 36 away from the retainer 58 and toward the handle 12 releases the retainer 58 for swiveling or pivotable movement on the transverse axis or rotational movement around the longitudinal axis of the tool. The sleeve 36 is further maintained in this released disposition by the force of the ball 34 being biased by spring 32 against the inner surface (the threads 38) of the sleeve 36. Because the neck portion 44 of the ball joint 42 has a smaller diameter than the ball joint 42 itself, a clearance space is provided for the lower rim 64 of the retainer 58 to move within during the various types of movement. As the retainer 58 is pivoted about the ball joint 42, the resistance spring 56 rides upon the head of the ball joint 42 in conjunction with retainer 58 movement and provides a slightly resistive force against the inner concave wall of the retainer 58, thus helping to maintain the respective angular displacement of the retainer 58. Without the resistive spring 56 applying a linear force to the retainer 58, the retainer 58 will not be able to maintain its particular pivoted disposition but would simply fall downward when disengaged from the screw upon which the tool 10 was being used. The aperture 48, as opposed to a bore of uniform diameter, also increases the range of angular displacement or pivotable movement of the entire working end. Thus, the working end swings or swivels on the transverse axis of the ball joint 42 and the working end is also capable of complete rotation around the longitudinal axis of the shank 22 and handle 12. Indeed, the user can swivel and rotate the working end at the same time during alignment and use of the tool 10.

FIG. 5 illustrates the hand tool 10 of FIGS. 1–4 utilizing only one retaining pin. The ball joint 68 of FIG. 5 has been slightly modified in that the pin receiving slot 46 has been eliminated and only the aperture 48 is used. It is a simple matter to attach the retainer 58 to the ball joint 68. First, the resistive spring 56 is placed on the head of the ball joint 68 and then the retainer 58 is slid onto the ball joint 68 so that the ball joint 68 and resistive spring 56 are encompassed within the cavity 60. Finally, the bores 66 that extend through opposite sidewalls of the retainer 58 are aligned with the aperture 48 so that the retaining pin 54 can be inserted through one bore 66, into and through the aperture 48, and then into the opposite bore 66 so that both ends of the retaining pin 54 are flush with the sidewall, thus securing the retainer 58 to the ball joint 68. Otherwise, the tools 10 shown in FIGS. 1–5 are identical.

Illustrated in FIG. 6 is an alternate embodiment for the hand tool 10 first shown in FIGS. 1–5. The primary purpose of the alternate embodiment of the tool 10 of FIG. 6 is to permit the user to turn the handle 12 with one hand while retaining the engagement of the working tip or bit end against the screw, or other type of fastener, by utilizing structural elements which assist the user in maintaining the alignment and engagement of the working tip with the screw, or other type of fastener. More specifically, the embodiment illustrated in FIG. 6 includes a cylindrical tool bit retainer 70 which swivels on the ball joint 42 or rotates around the longitudinal axis. The retainer 70 includes a lower annular flange or shoulder 72 which forms the bottom of the retainer 70. Oppositely disposed from the shoulder 72 and adjacent the end of the retainer 70 that holds the tip or bit is an annular groove 74. Located adjacent the annular shoulder 72 are a pair of oppositely-disposed pin receiving holes 76 which are axially aligned with each other and extend through each respective lower portion of the sidewall of the retainer 70. Adjacent the shoulder 72, and located internally within the retainer 70, is a concave-shaped posterior cavity 78 which projects into and slightly past the location of the holes 76 so that the cavity 78 has sufficient depth to permit registration with the holes 76 and insertion therein of the ball joint 42. Located adjacent the groove 74 is a tool or screwdriver bit receptacle or socket 80, which in the present embodiment is hexagonal-shaped, and the socket 80 has the size and depth to receive and hold therein any of a variety of bits, such as the bits 18 shown in FIGS. 1–3 and 5. A cylindrical retaining pin 82 is used to secure the retainer 70 onto the ball joint 42. In order to secure the retainer 70 to the ball joint 42, the resistive spring 56 is placed onto the head of the ball joint 42 and then the ball joint 42 is positioned within the cavity 78 so that the aperture 48 is aligned with both holes 76. With this position achieved, the retaining pin 82 can be inserted through the one hole 76, into and through the aperture 48 and then into the opposite hole 76 so that the ends of the retaining pin 82 are flush with the sidewall of the retainer 70.

As shown in FIG. 6, a split ring 84 is disposed in the groove 74 adjacent the socket 80 of the retainer 70. The split ring 84 is disposed into the groove 74 after a working end alignment and guide sleeve 86 is inserted onto and fully encompasses the retainer 70. The cylindrical guide sleeve 86 includes a knurled exterior surface 88, and an interior bore 90 coequal in length with the guide sleeve 86. The inside diameter of the bore 90 of the guide sleeve 86 is slightly larger than the outside diameter of the retainer 70 and this allowance between the retainer 70 and the guide sleeve 86 provides a clearance space for allowing the guide sleeve 86 to freely rotate about the axis of the retainer 70. While the guide sleeve 86 is capable of rotatable movement about the retainer 70, the guide sleeve 86 is held in position and prevented from linear reciprocable movement thereon by having its lower annular end or rim rest upon the shoulder 72 and its upper rim confined by the split ring 84. The guide sleeve 86 allows the user to first swing, swivel or rotate the working end of the tool 10 to reach a difficult area, or an area inaccessible with a rigid, elongated hand tool, and, with one hand of the user firmly grasping the guide sleeve 86, the user can then turn the hand tool 10 with his other hand to loosen or tighten the screw being worked upon while at the same time maintaining the alignment and engagement of the tool bit 18 against the screw. The alignment and guide sleeve 86 allows the user to maintain contact and engagement of the bit end with the screw while, at the same time, the guide sleeve 86 does not interfere with the rotation of the tool 10 during its period of use against the screw. The retainer 70 is capable of rotating in a full 360° circle around the axis of the handle 12 and shank 22 and can swivel on the transverse axis of the ball joint 42 at least 60° relative to the longitudinal axis of the handle 12 and shank 22.

Illustrated in FIGS. 7 and 8 is an alternate preferred embodiment of a tool 92 utilizing the ball joint assembly first shown in FIGS. 1–6 to provide a pivotable, swiveling, and rotatable socket extension which is capable of selective angular displacement with respect to the longitudinal axis of the shank 94 of the tool 92. Several features of the tool 92 shown in FIGS. 7 and 8 are similar or identical to features of the tool 10 illustrated in FIGS. 1–6. The shank 94 of the tool 92 shown in FIGS. 7 and 8 includes a threaded distal portion or end 96 and at least one blind hole 98 formed into the body of the shank 94. Disposed within the blind hole 98 is a compression/extension spring 100, and also seated on the spring 100, and projecting partially outboard of the blind hole 98, is a resistance ball 102. Integrally formed at the end of the shank 94 is a ball joint 104 having an hourglass-shaped, aperture 106 extending through the diameter of the ball joint 104. A retaining pin 108 is inserted through the aperture 106 for securing structure hereinafter more fully described to the ball joint 104. While the tool 92 of FIGS. 7 and 8 shows a single aperture ball joint 104, it is quite conceivable that a ball joint identical to the one shown in FIG. 1 could also be used for this tool 92. Mounted onto the threaded portion 96 of the shank 92 for linear reciprocal movement by rotation thereupon, is a cylindrical socket extension locking and releasing sleeve 110. The sleeve 110 includes an interior bore or chamber 112 coequal in length with the sleeve 110, and circumjacent the chamber 112 are interior threads 114. In addition, the outer wall or sidewall 116 of the sleeve 110 has a knurled finish to facilitate secure gripping thereof by the user.

As shown in FIGS. 7 and 8, the socket extension includes a swiveling, pivotable, and rotatable socket extension member 118 which is secured to the ball joint 104. The member 118 is capable of angular displacement relative to the longitudinal axis of the shank 94 of the tool throughout a complete 360° range of circular motion. The member 118 also has an angular displacement of at least 60° from the longitudinal axis of the tool 92. The member 118 includes a posterior cavity 120 which is sized to encompass the ball joint 104 when the member 118 is secured thereto. The cavity 120 includes a pair of oppositely-disposed socket extension holes 122 which are aligned with each other and, further, the holes 122 are aligned with the aperture 106 so that a retaining pin 124 can be inserted through one hole 122, through the aperture 106, and then into the opposite hole 122 so that the ends of the pin 124 are flush with the sidewalls of the member 118, thus securing the member 118 to the ball joint 104. Located within and extending through the body portion of the member 118 is an inner bore 126 which is concentric with the longitudinal axis of the member 118. The inner bore 126 extends from a socket head 128 to, but not registering with, the cavity 120. Located at approximately the mid-portion of the member 118 is a cross-arm slot 130 that extends transverse to the longitudinal axis of the inner bore 126. The cross-arm slot 130 registers with and opens up to the cylindrical surface of the member 118.

Beginning at the socket head 128 and moving backward toward the cavity 120, the member 118 includes a first annular shoulder 132, a second annular shoulder 134, and a third annular shoulder 136. Disposed between the first and second shoulders 132 and 134 is an annular split ring groove 138. Disposed within the inner bore 126 for selective slidable, linear reciprocal movement therein is a T-shaped member 140. The T-shaped member 140 includes transverse cross-arms 142 that ride within the cross-arm slot 130 concomitant with the linearly-reciprocable movement of the leg of the T-shaped member 140 within the inner bore 126. Also disposed in the inner bore 126 is a compression spring 144 having a first end which abuts the end of the inner bore 126 adjacent the cavity 120 and a second end which abuts the leg of the T-shaped member 140. The spring 144 does not travel within the inner bore 126 but provides a linearly-directed force against the T-shaped member 140 that continuously forces the T-shaped member 140 toward the socket head 128. The T-shaped member 140 includes a sloped or inclined tip or projection 146 for providing a camming surface for a single socket locking ball 148. The socket head 128 includes a single aperture 150 which registers with at least one of the flat surfaces of the socket head 128 and also with the inner bore 126.

As shown in FIGS. 7 and 8, a linearly-reciprocable, slidable socket locking and releasing means is disclosed to lock and release any of the variety of sockets to the socket head 128. A cylindrical socket locking and releasing sleeve 152 is disposed onto and circumjacent the socket extension member 118. The sleeve 152 is positioned between a split ring 154 and the third annular shoulder 136. The inside diameter of the sleeve 152 is slightly larger than the outside diameter of the member 118 taken between the second shoulder 134 and third shoulder 136, and this allows the sleeve 152 to move in a selectively linearly-reciprocable motion between the split ring 154 and the second shoulder 134. The split ring 154 limits the forward movement of the sleeve 152 while the second shoulder 134 limits the rearward movement of the sleeve 152; forward movement being defined as movement toward the socket head 128, and rearward movement being defined as the movement toward the ball joint 94 and shank 104.

In order to release the member 118 for angular displacement relative to the shank 94 axis, the user simply rotates the locking and releasing sleeve 110 so that the sleeve 110 rotates on the threads 96 of the shank 94 away from the ball joint 104 and toward the handle of the tool 92. The resistance ball 102 and spring 100 prevent the sleeve 110 from slipping by applying a continuous perpendicularly-directed force against the interior threads 114 of the sleeve 110. This resistance force prevents slippage of the sleeve 110 from the position to which it has been rotated by the user. In addition, the conical-shaped spring 156 provides a resistive force against the interior walls that define the cavity 120 so that once the socket extension member 118 is swiveled or rotated to a particular angular disposition, the member 118 maintains its angular displacement throughout the period of use against the workpiece, such as the screw to be inserted into or removed from some structure or component.

In order to attach a socket (not shown) to the socket head 128, the user simply pulls the socket locking and releasing sleeve 152 slightly rearward toward the ball joint 104. This rearward movement of the sleeve 152 causes the cross-arms 142 to slide rearward within the cross-arm slot 130 and also causes the leg of the T-shaped member 140 to travel rearward within the inner bore 126, compressing the spring 144. As this action occurs, the socket locking ball. 148 rolls downward and inward on the camming surface of the projection 146 so that the ball 148 essentially rolls partially or completely within the bore 126 of the socket head 128. The user holds the guide sleeve 152 in its rearwardly-drawn state for the time it takes the user to securely seat a respective socket completely onto the socket head 128. Upon seating the socket on the socket head 128, the user releases his grasp of the guide sleeve 152 and, as soon as this occurs, the spring 144 expands within the inner bore 126 and provides a linear force against the leg which causes the T-shaped member 140 to slide forward within the inner bore 126 toward the socket head 128. The cross-arms 142 slide forward within the cross-arm slots 130 toward the socket head 128 and the projection 146 of the T-shaped member 140 slides forward within the inner bore 126, causing the ball 148 to roll up the camming surface. As the projection 146 of the T-shaped member 140 completes its forward movement within the inner bore 126, the ball 148 is forced outward through the aperture 150 of the socket head 128. Once a portion of the ball 148 projects through the aperture 150 and abuts the mating inner concave depression on the inner surface wall of the particular socket, the locking of the socket onto the socket head 128 is achieved.

Thus, the tool 92 shown in FIGS. 7 and 8 not only provides the individual with a socket extension that is selectively rotatable relative to the longitudinal axis of the shank 94 of the tool 92, and can also swivel in any direction on the ball joint 104 to an angular range of at least 60° from the longitudinal axis, in order to allow the user to reach areas, components or parts that are difficult or even inaccessible to rigid, non-swiveling, non-rotatable, socket-type tools. Moreover, the tool 92 shown in FIGS. 7 and 8 also provides the user with a simple, efficient, and reliable means for locking and releasing any of a variety of sockets onto the socket head 128. Thus, the tool 92 includes both straight and offset drive capabilities, as well as quick socket mount and release capabilities.

The foregoing is considered as illustrative only of the principles of the invention. Numerous modifications and changes may readily occur to those skilled in the art, and it is not intended to limit the invention to the exact construction and operation shown and described. Accordingly, other modifications can be made without departing from the scope and spirit of the invention as defined in the appended claims.

What is claimed is:

1. A hand tool of the type having a handle and a shank secured thereto so that the handle and shank define a longitudinal axis, and a working end secured to the shank for angular displacement relative to the longitudinal axis, the hand tool comprising:

a locking and releasing means disposed on the shank for selective rotational movement thereon in order to engage or disengage the working end so that the working end can be locked in alignment with the axis of the handle and shank and released from alignment in order to permit angular displacement of the working end relative to the axis of the handle and shank;

angular displacement means secured to the shank so that the working end can swivel and rotate on an axis disposed transverse with respect to the longitudinal axis of the handle and shank;

the working end including a tool bit retainer mounted on the angular displacement means which can be selectively locking in axial alignment with the handle and
shank and released therefrom by selective rotational
movement of the locking and releasing means for
angular displacement relative to the axis of the handle
and shank;

resistive means mounted on the angular displacement
means to maintain the angular displacement of the
working end by providing a linear force against the
working end;

the locking and releasing means including a cylindrical
locking and releasing sleeve rotatably mounted on the
shank for selective reciprocal movement either toward
the handle to release the working end for angular
displacement relative to the longitudinal axis or away
from the handle and toward the working end to engage
the working end and lock the working end in alignment
with the longitudinal axis of the shank and handle;

the angular displacement means including a ball joint
integral to the shank and in axial alignment therewith
and which enables selective angular movement of the
working end;

the ball joint having a substantially spherical outer
surface, a slot therethrough and in a plane bisecting the
axis of the shank and a bore extending through the ball
joint and transverse to the slot; and first and second retaining pins for extending through the
bore and slot, respectively, for retaining the working
end on the ball joint.

2. The hand tool of claim 1 wherein the first retaining pin is fixedly contained within the bore and has an intermediate transverse cross-bore therethrough, and the second retaining pin extends through the cross-bore.

3. A hand tool of the type having a handle, a shank attached to the handle in fixed axial alignment therewith, and a working end mounted to the shank for angular displacement relative to the axis longitudinal of the handle and shank, wherein:

the shank has an attachment end secured to the handle and
an opposite distal threaded end;

a ball joint is formed at the distal end of the shank in axial
alignment with the shank;

the working end includes a tool bit retainer mounted on
the ball joint for selective angular displacement relative
to the longitudinal axis of the shank, the retainer
including an annular rim and an opposite tool bit
socket;

a cylindrical locking and releasing sleeve mounted on the
distal end of the shank for selective, reciprocal, linear
movement thereon so that the locking and releasing
sleeve can selectively engage the annular rim for lock-
ing the retainer in axial alignment with the handle and
shank and selectively disengage the annular rim in
order to release the retainer for angular displacement on
the ball joint and about the axis of the handle and
shank;

the shank having at least one bore extending thereinto and
perpendicular to the longitudinal axis for receiving
therein a compression spring and locking ball, the
compression spring biasing the locking ball against the
locking and releasing sleeve in order to prevent slip-
page of the locking and releasing sleeve from its linear
disposition on the shank;

a resistance spring mounted on the ball joint for providing
a resistive force against the tool bit retainer for main-
taining angular displacement of the retainer; and the ball joint being generally spherical in shape and
including at least one aperture extending transversely
therethrough and at least one retaining pin insertable
through the aperture for retaining the working end on
the ball joint.

4. A hand tool of the type having a handle, a shank attached to the handle in fixed axial alignment therewith, and a working end mounted to the shank for angular displacement relative to the longitudinal axis of the shank;

the shank having an attachment end secured to the handle
and an opposite distal threaded end;

a ball joint at the distal threaded end of the shank in axial
alignment therewith;

the ball joint having a uniformly arcuate outer surface to
enable the working end to pivot in a multiplicity of
separate lateral directions;

the working end including a tool bit retainer mounted on
the ball joint for selective angular displacement relative
to the longitudinal axis of the shank, the tool bit retainer
including a tool bit socket, an oppositely-disposed ball
joint receiving cavity into which the ball joint is
disposed, and an annular rim adjacent the ball joint
receiving cavity;

resistive means mounted on the ball joint and cooperating
with the working end to maintain angular displacement
of the working end by providing a linear force against
the working end; and a cylindrical locking and releasing sleeve mounted on the
distal threaded end of the shank for selective linear-
reciprocal movement toward the handle or the working
end as a result of rotational motion of the sleeve
whereby linear movement of the sleeve toward the
handle causes the sleeve to disengage from the annular
rim of the tool bit retainer in order to release the tool bit
retainer for angular displacement on the ball joint.

5. A hand tool having an angularly displaceable working end, comprising:

a handle;

a shank attached to the handle and having an attachment
end and an opposite distal end, the handle attached to
the shank in fixed axial alignment, and the handle and
shank defining a longitudinal axis;

a plurality of threads formed adjacent the distal end of the
shank;

swivel means on the shank's distal end permitting angular
displacement of the working end relative to the longi-
tudinal axis of the shank and handle;

sleeve means manually rotatable on the threads for selec-
tively locking the working end in axial alignment with
the handle and shank and selectively releasing the
working end for angular displacement;

the swivel means including a ball joint on the shank's
distal end and in axial alignment therewith; and the ball joint having a substantially spherical shape and at
least one retaining pin projecting therethrough for
connecting the working end to the shank.

* * * * *